(12) United States Patent
Schlueter, Jr. et al.

(10) Patent No.: US 6,245,402 B1
(45) Date of Patent: Jun. 12, 2001

(54) IMAGEABLE SEAM INTERMEDIATE TRANSFER BELT HAVING AN OVERCOAT

(75) Inventors: Edward L. Schlueter, Jr., Rochester; Gerald M. Fletcher, Pittsford; Kock-Yee Law, Penfield; Nancy Y. Jia, Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/460,896

(22) Filed: Dec. 14, 1999

(51) Int. Cl.⁷ ........................................ B32B 3/00

(52) U.S. Cl. .............................. 428/58; 474/254

(58) Field of Search ................. 428/57, 58; 474/253, 474/254

(56) References Cited

U.S. PATENT DOCUMENTS

| 5,487,707 | 1/1996 | Sharf et al. ..................... 474/253 |
| 5,514,436 | 5/1996 | Schlueter, Jr. et al. ............ 428/57 |
| 5,549,193 | 8/1996 | Schlueter, Jr. et al. ......... 198/844.2 |
| 5,721,032 | 2/1998 | Parker et al. ................... 428/57 |
| 5,942,301 | 8/1999 | Schlueter, Jr. ................... 428/58 |

Primary Examiner—Alexander S. Thomas
(74) Attorney, Agent, or Firm—John M. Kelly; David E. Henn

(57) ABSTRACT

An intermediate transfer belt with a mechanically and electrically invisible seam formed by joining two ends of the belt at a seam. Two regions of the belt are thus formed, a seam region at and around the seam and a far region away from the seam. An overcoat is then placed over the seamed substrate such that an outer surface of the overcoat forms a toner-bearing surface. The seam region has good electrical property correspondence (as explained in the patent) with the far region and a lateral resistivity greater than $10^8$ ohms/square. The joining of the belt can occur along a kerf.

29 Claims, 8 Drawing Sheets

IMAGEABLE SEAM INTERMEDIATE TRANSFER BELT HAVING AN OVERCOAT

FIELD OF THE INVENTION

This invention relates electrophotographic printing machines. Specifically, this invention relates to electrophotographic printing machines having seamed intermediate transfer belts.

BACKGROUND OF THE INVENTION

Electrophotographic printing is a well-known and commonly used method of copying or printing documents. Electrophotographic printing is performed by exposing a light image representation of a desired document onto a substantially uniformly charged photoreceptor. In response to that light image the photoreceptor discharges, creating an electrostatic latent image of the desired document on the photoreceptor's surface. Toner is then deposited onto that latent image, forming a toner image. The toner image is then transferred from the photoreceptor onto a receiving substrate such as a sheet of paper. The transferred toner image is then fused with the substrate, usually using heat and/or pressure. The surface of the photoreceptor is then cleaned of residual developing material and recharged in preparation for the production of another image.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated for a second color, say yellow, then for a third color, say magenta, and finally for a fourth color, say cyan. When the toner layers are placed in superimposed registration the desired composite color toner image is formed and fused on the receiving substrate.

The color printing process described above superimposes the color toner layers directly onto a substrate. Other electrophotographic printing systems use intermediate transfer belts. In such systems successive toner layers are electrostatically transferred in superimposed registration from the photoreceptor onto an intermediate transfer belt. Only after the composite toner image is formed on the intermediate transfer belt is that image transferred and fused onto the substrate. Indeed, some electrophotographic printing systems use multiple intermediate transfer belts, transferring toner to and from the belts as required to fulfill the requirements of the machine's overall architecture.

In operation, an intermediate transfer belt is brought into contact with a toner image-bearing member such as a photoreceptor belt. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating devices then transfers toner from the intermediate transfer belt to the receiver. Depending on the system, a receiver can be another intermediate transfer member or a substrate onto which the toner will eventually be fixed. In either case the control of the electrostatic fields in and near the transfer zone is a significant factor in toner transfer.

Intermediate transfer belts often take the form of seamed belts fabricated by fastening two ends of a web material together, such as by welding, sewing, wiring, stapling, or gluing. While seamless intermediate transfer belts are possible, they require manufacturing processes that make them much more expensive than similar seamed intermediate transfer belts. This is particularly true when the intermediate transfer belt is long. While seamed intermediate transfer belts are relatively low in cost, the seam introduces a discontinuity that interferes with the electrical, thermal, and mechanical properties of the belt. While it is possible to synchronize a printer's operation with the motion of the intermediate transfer belt such that toner is not electrostatically transferred onto the seam, such synchronization adds to the printer's expense and complexity, resulting in loss of productivity. Additionally, since high speed electrophotographic printers typically produce images on paper sheets that are cut from a paper "web," if the seam is avoided the resulting unused portion of the paper web must be cut-out, producing waste. Furthermore, even with synchronization the mechanical problems related to the discontinuity, such as excessive cleaner wear and mechanical vibrations, still exist.

Acceptable intermediate transfer belts require sufficient seam strength to achieve a desired operating life. While the desired operating life depends on the specific application, typically it will be at least 100,000 operating cycles, and more preferably 1,000,000 cycles. Considering that a seamed intermediate transfer belt suffers mechanical stresses from belt tension, traveling over rollers, moving through transfer nips, and passing through cleaning systems, achieving such a long operating life is not trivial. Thus the conflicting constraints of long life and limited topographical size at the seam places a premium on adhesive strength and good seam construction.

A prior art "puzzle cut" approach to seamed intermediate transfer belts significantly reduces mechanical problems by producing an improved mechanical seam. U.S. Pat. No. 5,514,436, issued May 7, 1996, entitled, "Puzzle Cut Seamed Belt;" U.S. Pat. No. 5,549,193 entitled "Endless Seamed Belt with Low Thickness Differential Between the Seam and the Rest of the Belt;" and U.S. Pat. No. 5,487,707, issued Jan. 30, 1996, entitled "Puzzle Cut Seamed Belt With Bonding Between Adjacent Surface By UV Cured Adhesive" teach the puzzle cut approach. While puzzle cuts reduce mechanical problems there remains other difficulties with transferring toner onto and off of a seam of a seamed intermediate transfer belt.

For transferring toner onto and off of a seam to be acceptable, the final image produced from across the seam must be comparable in quality to images formed across the remainder of the belt. This is a difficult task due to a number of interrelated factors. Some of those factors relate to the fact that the seam should not greatly impact the electrostatic fields used to transfer toner. However, electrostatic transfer fields are themselves dependent on the electrical properties of the intermediate transfer belt. While this dependency is complex and a more detailed discussion of this subject is given subsequently, briefly there are conditions where transfer fields are very sensitive to the resistivity and thickness of the materials used for the various layers of the intermediate transfer belt. Under other conditions the electrostatic transfer fields are relatively insensitive to those factors. Similarly, there are conditions where the electrostatic transfer fields are very sensitive to the dielectric constants of the materials used for the layers of the intermediate transfer belt, and other conditions where the electrostatic transfer fields are insensitive to the dielectric constants. Therefore, to successfully transfer toner onto and off of a seamed intermediate transfer belt the electrical properties across and around the seam should be carefully controlled to produce a proper relationship with the remainder of the belt. Since the electrical properties depend on the interrelated factors of seam geometry, seam construction (such as adhesive beyond the seam), seam topology, seam thickness, the presence of an overcoating, and various other factors those factors should be taken into consideration for a given application.

From above it can be seen that if toner is to be transferred onto and off of a seam that the critical properties at the seam region must be controlled such that the electrostatic transfer fields across the seam are close to those away from the seam. While conditions that achieve this are discussed in more detail later, generally those conditions involve the use of "forgiving resistivity ranges." However, it should be noted that one only needs to provide seam conditions that result in "sufficiently close" electrostatic transfer fields. Sufficiently close depends on the tolerance of a given system to differences in the electrostatic transfer fields. Experience shows that some systems can tolerate more than a 20% difference in the electrostatic transfer fields without a significant difference in the final image. However, high quality color systems usually must have less than a 10% difference to avoid noticeable problems. However, "sufficiently close" is best determined by experimentation.

Even if the electrical properties of a seamed intermediate transfer belt are suitable for producing acceptable images across the seam region, other problems remain. For example, with prior art seamed intermediate transfer belts relatively poor cleaning and transfer around the seam is acceptable. However, if toner is being transferred onto and off of the seam region the seam must be properly cleaned. Thus, the toner release and friction properties across the seam region would have to be comparable to those of the rest of the belt. Furthermore, most prior art seamed intermediate transfer belts have a significant "step" where the belt overlaps to form the seam. That step can be as large as 25 microns. Such a step significantly interferes with transfer and cleaning. Thus if toner is transferred onto and off of the seam, the seam's friction, toner release, and topography are much more constrained than those of other seamed intermediate transfer belts.

From above it can be seen that a seam's topography is very important if one wants to transfer toner onto and off of a seam region without significant degradation of the final image. The seam topography includes not only the seam itself, but also any overflow of the adhesive used in the seam. This overflow can occur on both the toner-bearing side and the back-side of the belt. Adhesive overflow is important because the belt seam strength can depend upon on that overflow. However, excessive overflow increases various mechanical, electrical, and xerographic problems. Furthermore, the adhesive's electrical properties remain important.

When attempting to transfer toner onto and off of a seam the seam's topography introduces spatial disturbances that are conveniently classified as "short-wavelength" disturbances and "long-wavelength" disturbances. While these disturbances both relate to the mean distance between adjacent peak-to-valley spatial defects, short-wavelength disturbances are small, say less than 3 millimeters, while long-wavelength disturbance are large, say greater than 3 millimeters. While both disturbances must be sufficiently controlled, short-wavelength disturbances usually require more stringent control than long-wavelength disturbances. Short-wavelength disturbances on the toner-bearing side of the belt are usually much more significant than on the back-side.

Short-wavelength disturbances include, for example, bumps, valleys or steps, kinks or distortions, and peak-to-valley roughness. Such defects are results of the seam type, adhesive overspill, seam manufacturing, or grinding or polishing. One problem with short wavelength disturbances is that they introduce small, unwanted air gaps at the transfer nips. Due to belt stiffness some "tenting" occurs due to short wavelength topography, and the extra air gaps caused by the short wavelength topography can then extend quite far beyond the location of the peak to valley distortion. The unwanted air gaps can be reduced by pressure in the transfer nip. Thus a pressured transfer field generation device, such as a conformable bias transfer roller, is generally preferred over a pressureless transfer field generation device, such as a corotron.

Small, unwanted air gaps could be reduced by using an intermediate transfer belt having a conformable overcoat. However, a conformable overcoat can introduce other problems, such as friction or poor electrostatic toner release. Also, for very short-wavelength disturbances, such as a large bump at the seam, the pressure needed to eliminate unwanted air gaps is normally impractical even if a conformable overcoat is used.

On the toner-bearing side small, unwanted air gaps can significantly limit electrostatic transfer fields due to Paschen air breakdown. As known in the art, for air gaps between about 5 microns and 100 microns the maximum field, $E_c$, that can be supported before breakdown in an air gap $d_A$ decreases with an increasing air gap. This is called Paschen air breakdown and it can be approximately expressed as: $E_c=[6.2 \text{ Volts/m}+(312 \text{ Volts})/d_A]$. When an applied E-field in an air gap tries to go above $E_c$, an air breakdown charge transfer occurs that limits the field to near or below $E_c$. Since air gaps of 5 to 15 microns can already be present near the edges of and within a toner image, extra air gaps will reduce the maximum E-field that can be present during electrostatic toner transfer of the toner. For example, if air gaps in a toner layer are about 15 microns, Paschen air breakdown will limit the applied electrostatic fields to around 27 volts/micron. However, if an unwanted air gap of 10 microns is introduced by the seam the total air gap increases to 25 microns and the transfer E-field will be limited to around 18.7 volts/micron. While a desirable transfer E-field depends on many factors, air gap transfer E-fields are typically above 20 volts/micron and often above 35 volts/micron.

In addition to transfer problems, short-wavelength disturbances can degrade the effectiveness of cleaning systems. Blade cleaning systems tend to work better with very small short-wavelength disturbances. For example, short-wavelength disturbances of about 0.1 microns can result in reduced friction between the blade and the cleaning surface, thereby helping cleaning.

Therefore, when attempting to transfer toner onto and off of a seam the seam's topography should not introduce transfer nip air gaps above around 10 microns. Preferably unwanted air gap should be less than around 5 microns, and more preferably less than around 1 micron.

When attempting to transfer toner onto and off of a seam without seriously impacting the final image, the seam's long-wavelength disturbances also must be sufficiently controlled to produce an acceptable final image. Examples of unwanted long-wavelength disturbances include "belt ripple" or "belt waviness" longer than 3 millimeters. Long-wavelength disturbances usually are less important than short-wavelength disturbances because a relatively low pressure on a belt can flatten long-wavelength disturbances.

Thus it is preferable to use a pressured transfer field generation device, such as a nip-forming bias transfer roller. Also, it is beneficial to tension the belt in cleaning zones such that the belt is relatively flat.

While small disturbances can be significant on the toner-bearing side of a belt, larger backside disturbances can usually be tolerated. First, this is because air gaps introduced by back-side disturbances do not usually cause unwanted air gaps on the toner-bearing side of the belt. Therefore backside induced Paschen air breakdown is not a major issue. Second, since good back-side cleaning is usually not required the topography constraints related to cleaning are typically not an issue. Finally, for a conformable belt, belt conformance can prevent gaps on the back-side of the belt from being a significant problem. In general, back-side topography should not introduce air gap higher than 10 microns, and preferably it should be less than 5 microns.

While seamed intermediate belts without an overcoat are relatively low cost and relatively simple to manufacture, an overcoat on the toner bearing surface can insure that the seam region has the same toner release and friction properties as the rest of the belt. This enables a wider range of adhesives to be used. Therefore, seamed intermediate transfer belts typically include a substrate layer and an overcoat formed from one or more overcoating layers. Those layers have electrical properties that prevent high voltage drops across the belt, that prevent high pre-nip transfer fields via lateral conduction of the belt, that avoid charge buildup, and that prevent high current flow.

While the electrical properties of a seamed intermediate transfer belt should be controlled so as to integrate that belt with other electrophotographic printer subsystems, acceptable belt resistivities should be typically less than $1\times10^{13}$ ohm-cm volume resistivity and more than $1\times10^{8}$ ohms/square lateral resistivity. Lateral resistivity is defined as being the volume resistivity in the direction of belt motion divided by the layer's thickness. In some cases the belt resistivity is sensitive to the applied field. In such cases the volume resistivity should be referenced to a corresponding range of applied fields. While the applied field depends on the particular system design, the upper limit volume resistivity is generally measured at a field corresponding to between 10 to 100 volts across the layer thickness, and the lower limit lateral resistivity of interest is generally measured between 500 to 2000 volts/cm.

Seamed intermediate transfer belts can also have constraints on the lower limit of their volume resistivity in the thickness direction. Typically such constraints occur in systems where the intermediate belt contacts or moves so close to a low resistivity surface in a transfer zone that the possibility of high resistive or corona discharge current density flow between the belt and the low resistivity surface exists. One example of such a system is a drum photoreceptor that has scratches or pin holes in an otherwise insulating drum coating. An intermediate transfer belt can momentarily come very close or even touch the highly conductive drum substrate at the scratches or pin holes in the transfer zone. Another example is a system that transfers toner from one intermediate transfer belt to a second, relatively conductive intermediate transfer receiver. In such systems if the intermediate system composite resistance, $R_{comp}$ in the transfer nip is too low, problems can occur due to undesirably high local current density flow between the intermediate transfer belt surface and the low resistivity contacting surfaces in the transfer nip. Problems can include local "shorting" between the intermediate transfer belt surface and the receiver that can cause momentary loss of the local applied electrostatic transfer field, and thereby result in degraded toner transfer. The composite resistance, $R_{comp}$, in the transfer nip is the sum of all possible "shorting" resistance paths in the transfer nips. The composite resistance path includes, for example, the effective resistance path of the transfer field generating device, the resistance path of the intermediate belt substrate, and the resistance path of the intermediate belt overcoat.

Shorting issues can be solved by insuring that there is a "sufficiently high" composite resistance path within the transfer nips. Whether a composite resistance is "sufficiently high" depends on the system, and especially on the type of power supply used for the field generating system. The shorting issue occurs when the shorting leakage current flow in the intermediate transfer nips is "too high." The shorting leakage current flow is the applied potential difference in the transfer nip divided by the composite resistance. For example, the current will be "too high" when it exceeds the power supply current capability. Typical power supplies used in transfer systems limit the current to less than 2 milliamps, so such shorting currents are "too high" for most systems. Other power supplies used in transfer systems use constant current power supply control. In such systems, the applied transfer fields are related to the portion of the controlled current that is not shorting leakage current. Thus any shorting leakage current tends to significantly reduce the transfer fields. Typically, with a constant current control, the shorting leakage current will be "too high" when the leakage current exceeds about 20% of the nominal constant current control.

The allowed lower resistivity limit of an intermediate transfer belt also depends on other system inputs. For example, the shorting problem caused by photoreceptor defects depends on the size of the defects that are present in the system. So, in systems that maintain very good defect free high dielectric strength drum coating layers, shorting to drum defects can be avoided even with extremely low volume resistivity intermediate transfer belts. Thus the allowed lower limit for the volume resistivity can vary widely. Still, experience suggests guidelines to avoid shorting problems. To avoid problems in systems that have a "small area shorting contact" in the transfer nip, such as in the drum defect example, the volume resistivity of the topmost layer on the intermediate transfer belt should be above $10^{7}$ ohm-cm, with a preference of being above $10^{8}$ ohm-cm. The resistivity values apply for intermediate material layer thickness that is at least around 25 microns thick or larger. If the resistivity of the materials used for the intermediate transfer belt arc sensitive to the applied field, the volume resistivity should be measured with an applied potential difference across the transfer belt that is similar to the applied potential difference used in the transfer system. With low resistivity intermediate materials, this is typically around 200 to 1000 volts across the thickness of the intermediate belt material.

It can be appreciated by those skilled in the art of electrostatic transfer that the electrical properties allowed for any particular intermediate transfer belt application can depend on many factors. Thus some systems can achieve acceptable intermediate transfer performance with intermediate transfer belt material layers having a much higher resistivity than $1\times10^{3}$ ohm-cm and with materials layers having a much lower lateral resistivity than $1\times10^{8}$ ohms/square. For example, a problem with very high resistivity intermediate materials layers is charge buildup between transfer stations or belt cycling. However, charge buildup problems can be minimized with belt material layers having much higher resistivity than $1 \times 10^{13}$ ohm-cm if suitable charge conditioning devices such as corotrons or scorotrons are provided along the circumference of the intermediate transfer belt configuration to reduce and level the unwanted charge buildup. Generally, with very high resistivity intermediate material layers in color systems, charge conditioning devices are necessary but not sufficient. To be fully effective the total dielectric thickness of any very high resistivity belt layers must also be kept low, typically less than 25 microns, and preferably less than 10 microns. Unwanted cost and complexity is introduced by the need for cyclic charge conditioning devices, and therefore intermediate systems most typically prefer suitably lower resistivity intermediate materials.

Similarly, although not preferred, some systems can use intermediate transfer belts that have material layers on the belt that have lateral resistivity less than $1 \times 10^8$ ohms/square. Such belts are typically not desired because, if any layer of an intermediate transfer belt has a lateral resistivity somewhat less than $1 \times 10^8$ ohms/square, high electrostatic transfer fields can occur in the pre-nip region of the transfer zones before contact of the belt with the toner. High pre-nip fields can cause toner transfer across large air gaps in the pre-nip region and this can result in undesirable toner disturbance or splatter of the toner beyond the edges of the image. Also, due to lateral conduction of charge away from the contact transfer nip, any increase in the transfer fields in the contact nip automatically increases the fields in the pre-nip region. This can cause pre-nip air breakdown between the toner and intermediate belt prior to the contact nip. Charge exchange due to pre-nip air breakdown limits the applied transfer fields and it tends to reverse the polarity of any untransferred toner in the pre-nip region. This can then limit transfer efficiency and it can cause image defects due to the non-uniform nature of typical pre-nip air breakdown. However, if the toner adhesion in a particular system is low such that the required electrostatic transfer fields in the nip for good transfer are low, pre-nip field problems caused by lateral conduction can be a small issue. Then, some systems can achieve acceptable transfer performance in spite of having low intermediate belt lateral resistivity.

A complication in enabling transfer of toner onto and off of a seamed intermediate transfer belt is that the electrical properties of an intermediate transfer belt and the seam are generally not constant. For example, the resistivity of most materials used for seamed intermediate transfer belts depend on the fields within the material. Those electrical properties can also depend on the environment, aging, and use. In addition, many manufacturing processes can produce a relatively wide distribution of resistivity values for film materials due to small variations in the resistivity control factors in the manufacturing process. Thus, the materials used for intermediate transfer belts and for the seam adhesives can have resistivities that vary by more than a factor of 100. Therefore, a transfer system in which toner is transferred onto and off of a seamed intermediate transfer belt must be designed to operate over a wide range of electrical properties.

One method of compensating for the wide variations of the electrical properties of intermediate transfer belts is to use a "set point control" approach. For example, a transfer setpoint, such as an applied voltage or field-generating device, can be adjusted to compensate for environmental effects such as temperature and relative humidity that would otherwise change the intermediate transfer belt's electrical properties. Such an approach is effective because the electrical property changes due to the environment are substantially the same at all points along the belt. In general, the "set point" control approach enables a wider tolerance in the electrical properties of the intermediate transfer belt, provided those properties do not greatly vary along the belt's periphery. However, the set point control approach loses effectiveness when the electrical properties of the intermediate transfer belt vary over small distances, such as across a seam gap. Therefore, a seamed intermediate transfer belt suitable for receiving and transferring toner onto and off of its seam would generally require seam electrical properties that maintain a close relationship to the changing electrical properties of the rest of the belt. This presents a problem because the electrical properties of many otherwise good seam adhesives may not have the same responses as the rest of the belt.

Therefore, in view of the desirability of transferring toner onto and off of the seam of a seamed intermediate transfer belt without significant degradation of the final image, and in view of the limitations in prior art seamed intermediate transfer belts in doing so, a new seamed intermediate transfer belt would be beneficial.

SUMMARY OF THE INVENTION

The principles of the present invention provide for imageable seam intermediate transfer belts having an overcoat. An imageable seam intermediate transfer belt according to the principles of the present invention includes a seamed substrate formed by joining ends of a belt at a seam. Two regions of the belt are thus formed, a seam region at and around the seam and a far region away from the seam. An overcoat is then placed over the substrate such that the overcoat forms a toner-bearing surface. The seam region has good electrical property correspondence with the far region and seam and far regions have lateral resistivity greater than $10^8$ ohms/square. Furthermore, the seam region has good short and long wavelength topography.

Another imageable seam intermediate transfer belt according to the principles of the present invention includes a seamed substrate formed by joining ends of a belt having a top-side surface and a back-side surface along a kerf to form a seam. Two regions of the belt are thus formed, a seam region around the kerf and a far region away from the kerf. An overcoat is then placed over the top-side surface such that the side opposite the top-side surface has a toner-bearing surface. The seam region has good electrical property correspondence with the far region. Furthermore, the seam and far regions have a lateral resistivity greater than $10^8$ ohms/square and the seam region has good short and long wavelength topography.

BRIEF DESCRIPTION OF THE DRAWINGS

Other features of the present invention will become apparent as the following description proceeds and upon reference to the drawings, in which.

DETAILED DESCRIPTION OF THE INVENTION

While the principles of the present invention are described below in connection with several embodiments it should be understood that the present invention is not limited to those embodiments. On the contrary, the present invention is intended to cover all alternatives, modifications, and equivalents as may be included within the spirit and scope of the appended claims.

Figure 1:
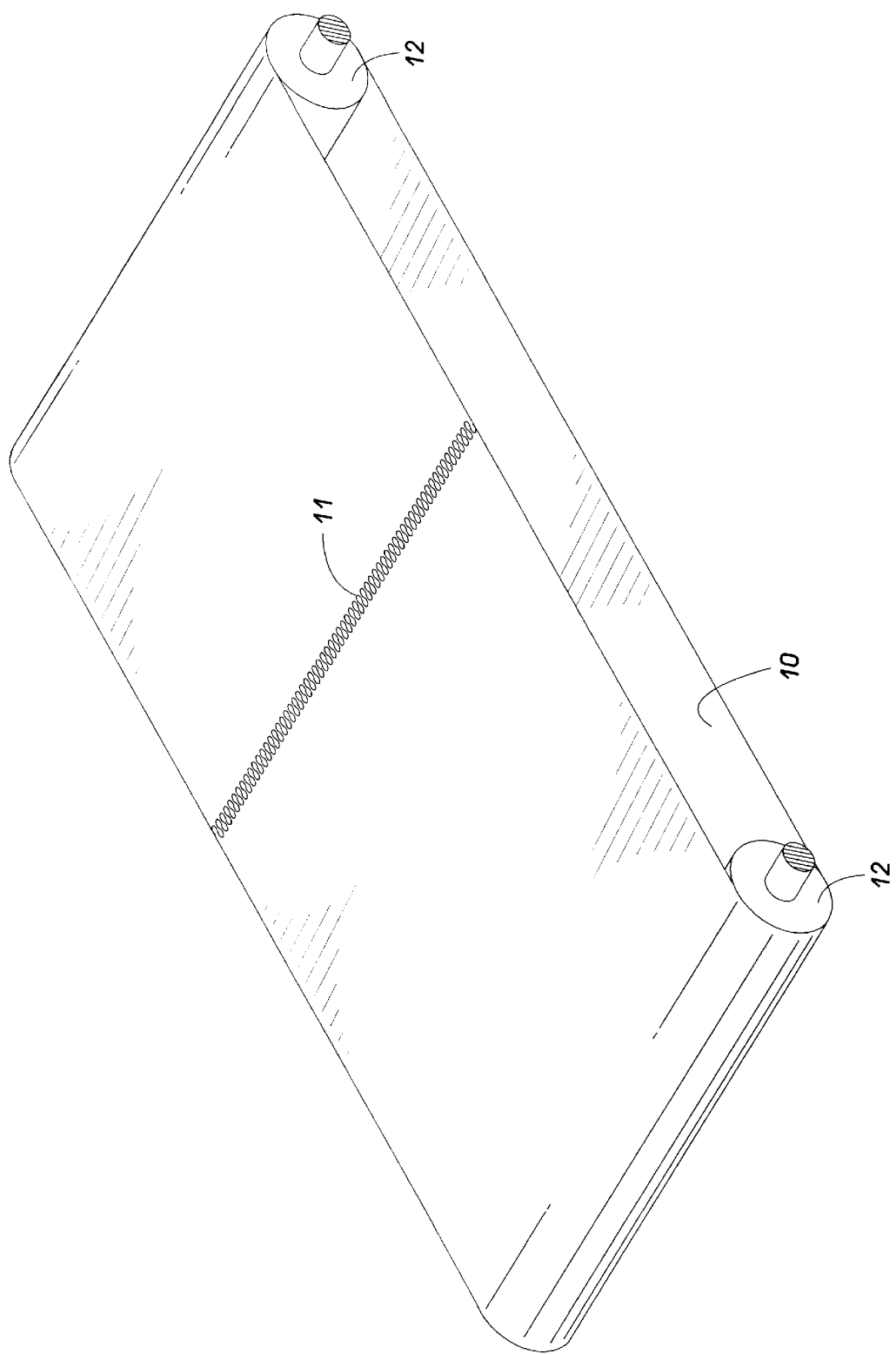
FIG. 1 is an isometric representation of a puzzle cut seamed substrate layer.

The principles of the present invention provide for a seamed intermediate transfer belt that is suitable for receiving toner, including over the seam region, and for subsequently transferring that toner onto a receiver in the process of producing a final image. That intermediate transfer belt is subsequently referred to as an imageable seam intermediate transfer belt. Such a belt begins with a substrate layer 10 as shown in FIG. 1. In practice that substrate layer is usually semiconductive. The substrate has its ends joined together to form a continuous member using an externally applied adhesive. Alternatively, the continuous member could be formed by melting the substrate's ends together using heat welding, solvent welding, or other joining methods. The region around the joined ends can have properties that are significantly different than the regions far from the seam region of the joined belt. These local adjacent regions will be referred to as the "gap" region.

Beneficially the ends are joined using mechanically interlocking "puzzle cut" tabs that form a seam 11. While the seam is illustrated as being perpendicular to the two parallel sides of the substrate layer the seam could be angled or slanted with respect to the parallel sides. While the seam 11 is puzzle cut it could also be formed in other fashions, such as using an overlapping seam (see FIG. 7). However, the puzzle cut is currently the preferred case. Reference U.S. Pat. Nos. 5,487,707; 5,514,436; 5,549,193; and 5,721,032 for additional information on puzzle cut patterns. Typically the seam 11 is about ¼ inch wide.

The substrate layer 10 can be made from a number of different materials, including polyesters, polyurethanes, polyimides, polyvinyl chlorides, polyolefins (such as polyethylene and polypropylene) and/or polyamides (such as nylon, polycarbonates, or acrylics). If required, the selected material is modified by the addition of an appropriate filler such that the substrate layer has a desired electrical conductivity. Appropriate fillers can include for example carbon, Accuflor carbon, and/or polyanaline. The substrate layer material should have the physical characteristics appropriate to an intermediate transfer application, including good tensile strength (Young's modulus, typically $1 \times 10^3$ to $1 \times 10^6$ newtons/m$^2$, resistivity (typically less than $10^{13}$ ohm cm volume resistivity, greater than $10^8$ ohms/square lateral resistivity), thermal conductivity, thermal stability, flex strength, and high temperature longevity. More information regarding electrical conductivity is given subsequently.

Figure 2:
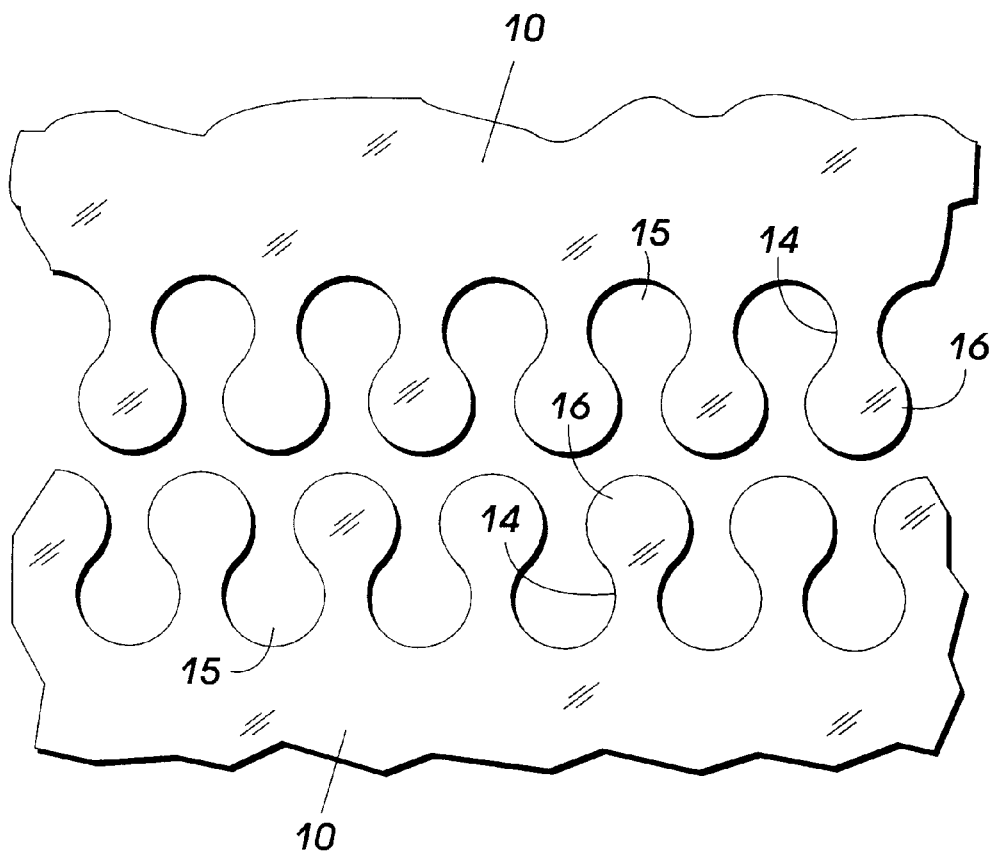
FIG. 2 shows a puzzle cut tab pattern used in the substrate layer of FIG. 1.

FIG. 2 illustrates a puzzle cut tab pattern. Each tab is comprised of a neck 14 and a node 16 that fit into female 15 interlocking portions. The tabs can be formed using any conventional shaping technique, such as die cutting, laser cutting, or cutting wheel. The interlocking tab matings fit to reduce the stress concentration between the interlocking elements and to permit easy travel around curved members, such as the rollers 12 shown in FIG. 1. While FIG. 2 shows one puzzle cut pattern, others are possible. Reference the previously mentioned U.S. patent application Ser. No. 08/936,696, filed on Sep. 24, 1997, now U.S. Pat. No. 5,997,974 and entitled, "INVISIBLE SEAM ELECTROSTATOGRAPHIC BELT" for other puzzle cut patterns.

Figure 3:
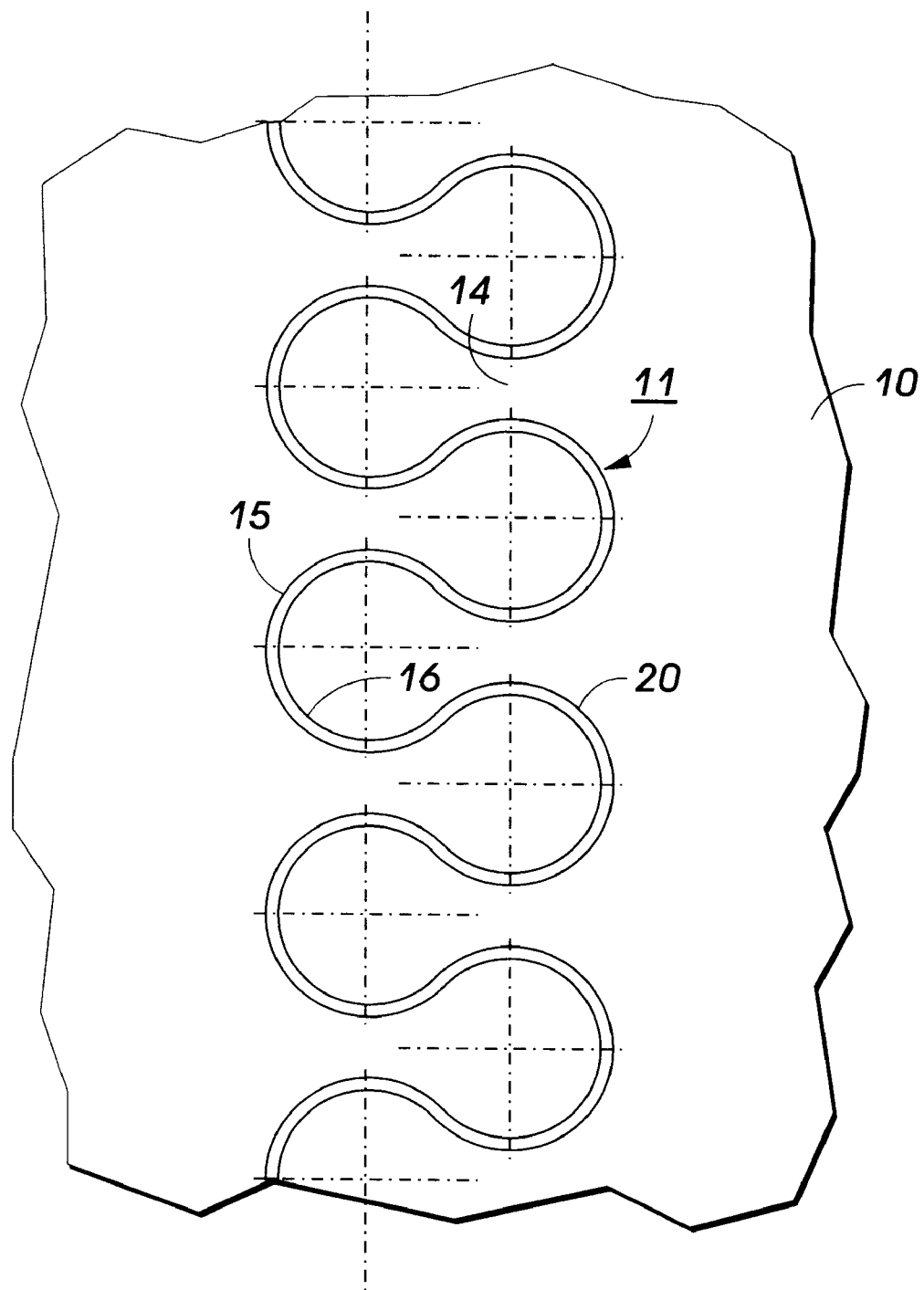
FIG. 3 illustrates the puzzle cut tabs of FIG. 2 interlocked together.
Figure 4:
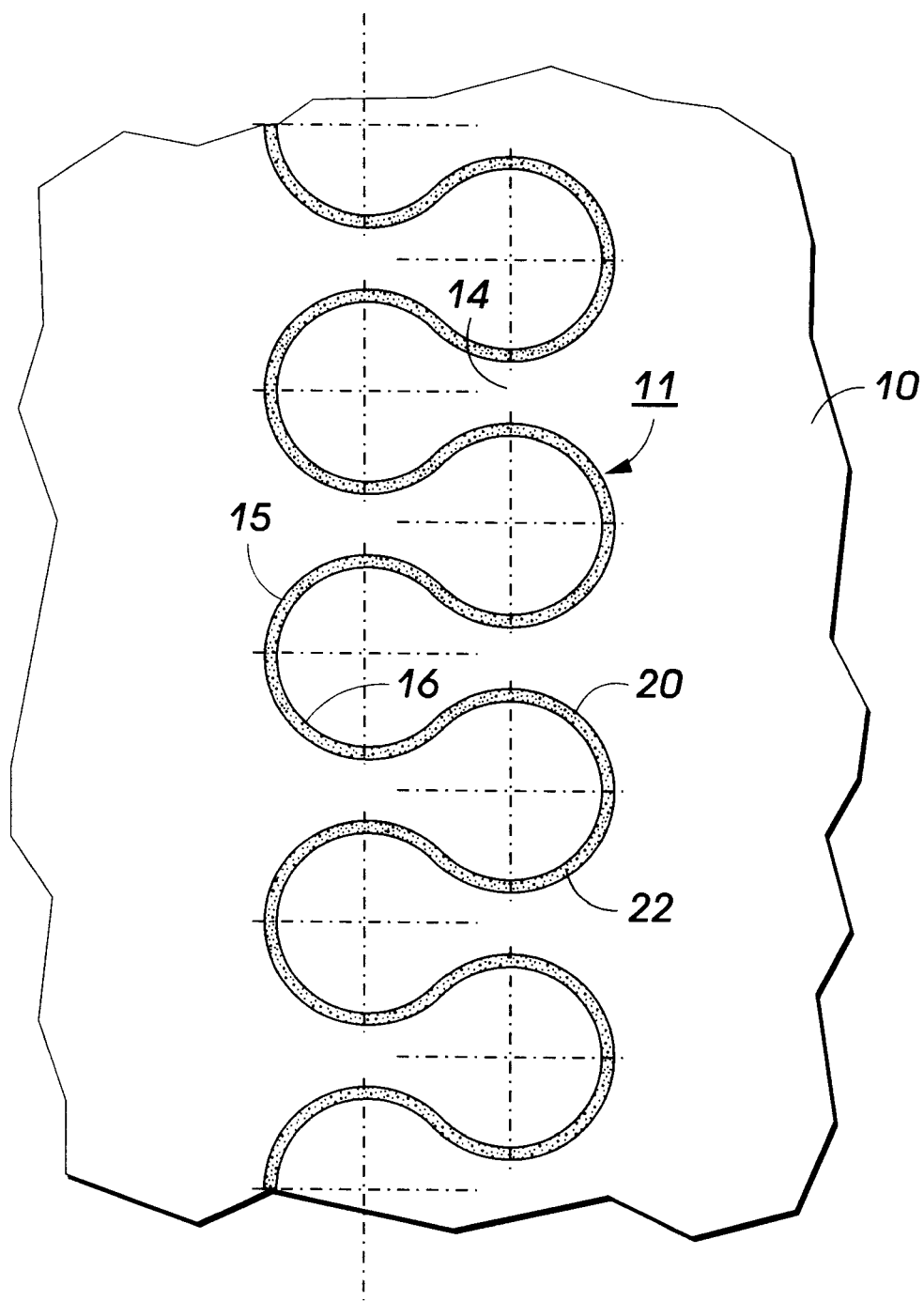
FIG. 4 illustrates the puzzle cut tabs of FIG. 3 with the kerf of FIG. 3 filled with an adhesive.

FIG. 3 illustrates the puzzle cut tabs of FIG. 2 interlocked together. Physically interlocking the puzzle cut tabs may require pressure when mating the tabs. Interlocking produces a void between the mutually mating elements that is called a kerf 20. As shown in FIG. 4 the interlocking tabs are held together using an adhesive 22 that files the kerf. The adhesive is designed to be physically, chemically, thermally, mechanically, and electrically compatible with the substrate layer material. Seams with a 25 $\mu$kerf have been typical for the puzzle cut seam while a kerf less than about 5 $\mu$can be preferred.

To be compatible with the substrate layer material the adhesive should produce a seam that is strong, smooth, and mechanically uniform. The mechanical strength and flexibility of the seam should be such that the belt operates satisfactorily for at least 100,000 cycles but preferably more than 1,000,000 cycles. Furthermore, topography parameters such as the height differential between the seamed and the unseamed portions of the substrate layer and the peak to valley distortions of the top and bottom of the seam need to be below critical levels. Acceptable topography parameter levels can depend on system factors, on the electrical properties of the adhesive, and on whether or not coatings are applied to the intermediate belt after the seaming, all of which will be discussed. However, the seam should typically be substantially free of large "bumps," "valleys," and other short-wavelength distortions.

In practice the adhesive 22 should have a viscosity such that it readily wicks into the kerf. Additionally, the surface energy of the adhesive should be compatible with the substrate layer material such that the adhesive adequately wets and spreads in the kerf. Furthermore, the adhesive should remain flexible and should adhere well to the substrate layer material. Finally, the adhesive also should have low shrinkage during curing. Appropriate manufacturing practices should be used to prevent excessive long-wavelength and short-wavelength disturbances. As an example, the adhesive can be a hot melt adhesive that is heated and pressed into the seam such that the adhesive is flattened, making it as mechanically uniform as possible with the substrate layer 10. Alternatively, the adhesive can be an epoxy-like material, a UV curable adhesives including acrylic epoxies, polyvinyl butyrals, or the like. Further, the "adhesive" can be substantially the substrate material itself, either applied during a separate adhesive application step or else by melting the two ends sufficiently to cause adhesion of the mutually mating elements. Following the application of the adhesive the seam 11 can be finished by buffing, sanding, or micro polishing to achieve a smooth topography.

Achieving a smooth topography is important for an imageable seam intermediate transfer belt. As previously discussed, sufficiently smooth short-wavelength and long-wavelength topographies are required on the toner-bearing side to avoid transfer and cleaning issues. A sufficiently smooth topography is also needed on the back-side of to avoid transfer issues. The short-wavelength seam disturbances for the back-side of the belt should be less than 10 microns to avoid transfer problems. On the toner-bearing side the short-wavelength seam disturbances should be less than 10 microns, more preferably less than about 5 microns, and most preferably less than 1 micro. If a blade cleaning system is used a smoother toner-bearing surface, say better than 1 micron short-wavelength seam disturbances, is better. In summary, the seam topography for an imageable seam intermediate transfer belt should preferably be substantially the same as the belt topography in regions away from the seam. However, some degree of degraded seam topography can be tolerated as long as the seam topography is within the constraints allowed for the particular application. Thus, while the previously discussed seam topography parameters are reasonable guidelines, the actual parameters are best determined experimentally for a particular application.

The relative electrical properties of the adhesive and the substrate are very important because they significantly affect the transfer characteristics of the resulting seam as compared to the transfer characteristics of the rest of the belt. Therefore, the adhesive should produce a seam that has electrical properties that corresponds to that of the substrate layer. That is, under operating conditions a seam should create an electrostatic transfer field in the toner transfer zones that is within at least 20%, preferably within 10%, of the electrostatic transfer field that is present for the remainder of the belt. Ideally the seam electrical properties are substantially the same as the substrate layer and have substantially the same electrical property dependence as the substrate on all important factors, such environment, applied field, and aging. However, significant differences in electrical properties can be allowed for some imageable seam conditions as discussed subsequently. The adhesive electrical properties can be met by mixing fillers or additives with an adhesive. For example, an adhesive might contain silver, indium tin oxide, CuI, SnO2, TCNQ, Quinoline, carbon black, NiO and/or ionic complexes such as quaternary ammonium salts, metal oxides, graphite, or like conductive fillers.

Figure 5:
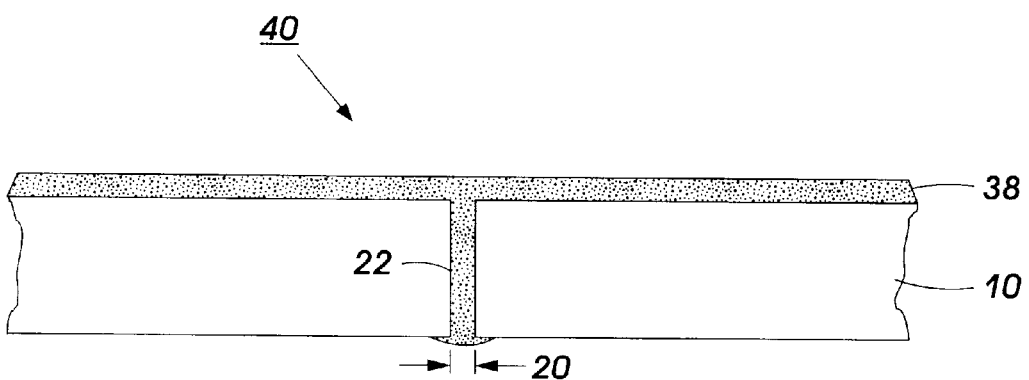
FIG. 5 is a cut-away view of an intermediate transfer belt in which an adhesive is applied over a substrate layer to form an outer coating.

With the adhesive in the puzzle cut seam, one or more overcoats are applied using conventional processes such as dip coating, flow coating and spray coating. As shown in FIG. 5, an imageable seam intermediate transfer belt 40 might have an overcoat 38 that is comprised of the adhesive 22 itself. However, because intermediate transfer belts have stringent toner release requirements it may be desirable to use a special release overcoat 42 on the substrate layer 10 and on the adhesive 22 as shown in cut-away in FIG. 6. Additional coating layer(s) can be advantageous for various reasons. An overcoat can reinforce the seam strength. They can also reduce the electrostatic transfer field perturbations caused by a mismatch between the electrical properties of the adhesive and the substrate. Overcoats can also insure that the friction and toner release properties in the seam region are the same as over the rest of the belt. This increases the range of acceptable adhesives and prevents cleaning and transfer differences that might otherwise occur. Finally, overcoats can smooth out the seam region and thus reduce seam topography problems. However, overcoats increase the cost and complexity of manufacturing an imageable seam intermediate transfer belt.

Figure 7:
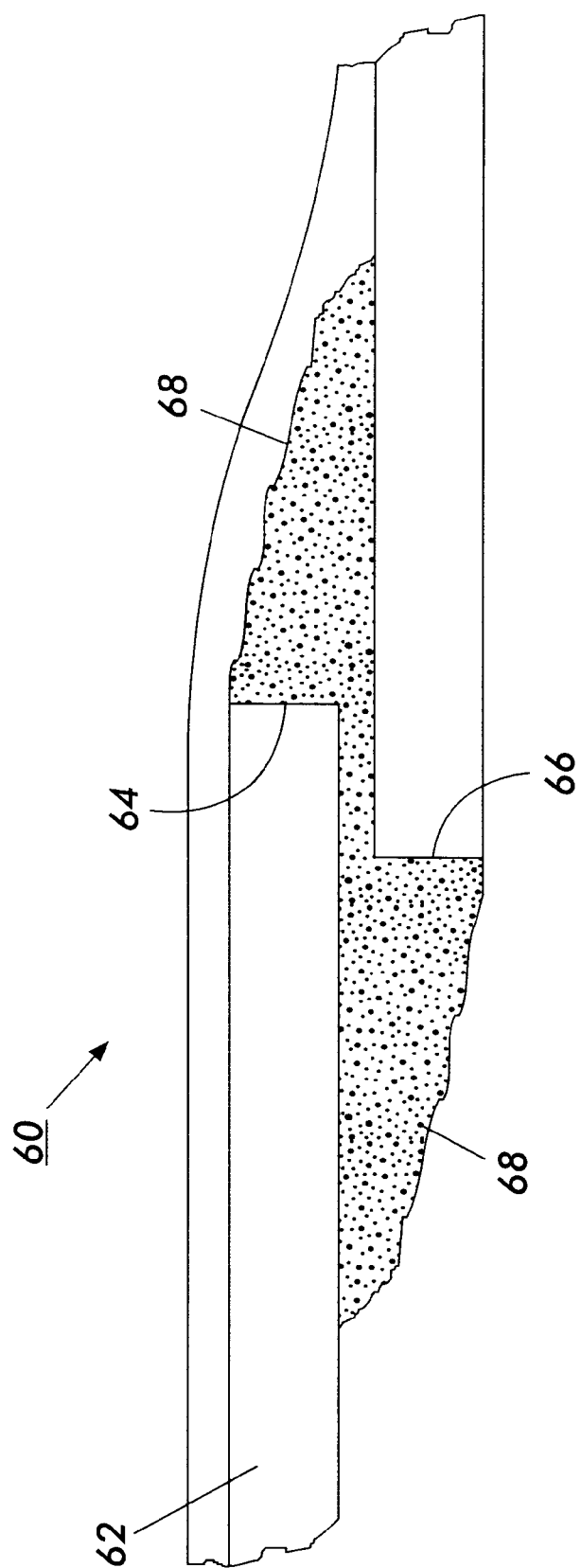
FIG. 7 is a close up side view of an intermediate transfer belt in which an adhesive is applied to overlapping ends of a substrate.

While the foregoing has described the use of puzzle-cut tabs, the principles of the present invention can be practiced with other types of joints. For example, FIG. 7 illustrates a cut-way view of an intermediate transfer belt 60. That belt includes a substrate layer 62 having ends 64 and 66 that overlap. Between the overlap, and extending over the top and bottom of the substrate layer, is an adhesive 68. Beneficially the adhesive tapers away from the overlap area such that a smooth transition is made. A smooth transition is needed to avoid previously discussed topography problems, and it also improves the mechanical characteristics of the intermediate transfer belt 60 when it passes over a roller. Over the top side of the belt is an overcoat 70.

The overcoats discussed with reference to FIGS. 5–7 beneficially have low friction and good toner release characteristics for enabling good transfer and cleaning. A friction coefficient less than about 1.0, and preferably less than 0.5, is suitable. Preferred overcoat materials include low surface free energy materials such as TEFLON™ type fluoropolymers, including fluorinated ethylene propylene copolymer (FEP), polytetrafluoroethylene (PTFE), polyfluoroalkoxy polytetrafluoroethylene (PFA TEFLON™); fluoroelastomers such as those sold by DuPont under the tradename VITON™; and silicone materials such as fluorosilicones and silicone rubbers.

Figure 6:
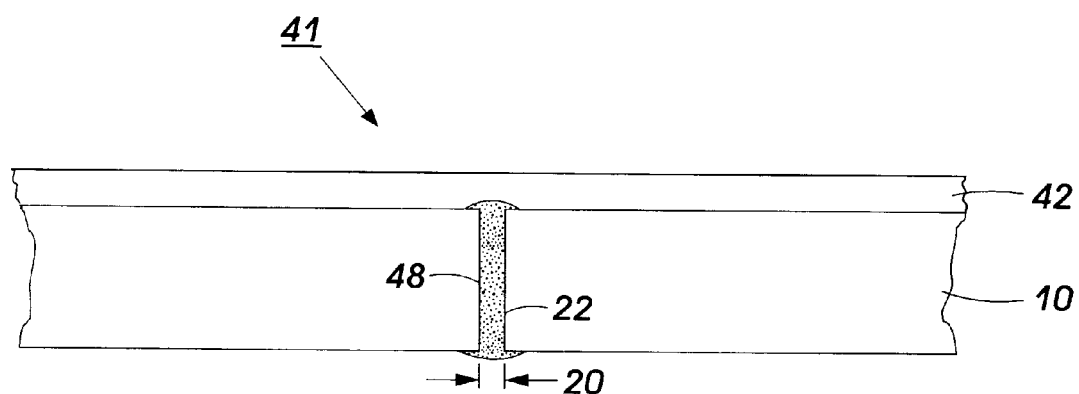
FIG. 6 is a cut-away view of an intermediate transfer belt in which an adhesive is applied to the seam and a coating is added to over the substrate layer and adhesive to form an overcoating.

Referring now back to FIG. 6, in one preferred embodiment of the intermediate transfer belt 41 the substrate layer 10, the adhesive 22, and the overcoat 42 are all semiconductive. In intermediate transfer systems, significant charge is deposited onto the belt when passing through a transfer zone. If the overcoat resistivity is too high, the voltage drop across the overcoat will build up after each successive pass through the transfer zone. This can adversely interfere with transfer performance. A sufficiently low resistivity overcoat can dissipate the voltage drop across the overcoat thickness via conduction during the dwell time between successive pass though toner transfer zones. The preferred resistivity $\rho_C$ for this desired charge dissipation depends on a "cyclic charge relation time." The cyclic charge relaxation time $T_{\rho^{cyc}}$, preferably should be less than a characteristic "cyclic dwell time", $T_{dcy}$, that being the time that a section of the intermediate transfer belt takes to travel between successive transfer zones. The cyclic dwell time is the distance between successive transfers divided by the belt speed.

If the overcoat resistivity is independent of the applied field, exponential charge decay across the overcoat thickness will occur and $T_{\rho^{cyc}}$ is given by: $T_{\rho^{cyc}} = K_C \rho_C \epsilon_0$, where $K_C$ is the dielectric constant of the overcoat, $\rho_C$ is the volume resistivity of the overcoat thickness, and $\epsilon_0$ is the permitivity of air. If the overcoat resistivity changes with the applied field a simple exponential charge decay will not occur. However, as an approximation the characteristic cyclic charge relaxation time expression $T_{\rho^{cyc}} = K_C \rho_C \epsilon_0$, can still be useful if the overcoat resistivity is specified at an applied field of interest that prevents too large of a voltage drop across the thickness. For overcoat materials that have a field sensitive resistivity, the overcoat resistivity that should be used in the cyclic charge relaxation expression preferably should be that determined at an applied field corresponding to less than 100 volts and more preferably less than 10 volts across the overcoat thickness. Sufficiently low resistivity at such fields will insure that there will be a low voltage drop across the overcoat. As an example, if an overcoat has $K_C=3$, an intermediate transfer system having a process speed near 10 in/sec and a distance between successive transfers of around 10 inches, the overcoat resistivity for charge dissipation preferably should be around $\rho_C < 3.8 \times 10^{12}$ ohm-cm. For a different process speed near 3 in/sec and otherwise similar conditions, the overcoat resistivity for charge dissipation preferably should be around $\rho_C < 10^{13}$ ohm-cm. Overcoat resistivities near the upper range of the high resistivity limits are mainly acceptable when the coating dielectric thickness, $D_C$, is sufficiently small, preferably smaller than around 25 microns. The dielectric thickness of the overcoat is the actual overcoat thickness divided by the dielectric constant of the overcoat $K_C$. As discussed below, thick overcoats can introduce additional transfer concerns, and thick overcoats tend to work better with a lower resistivity than the upper limits discussed thus far.

A sufficiently thick overcoat, for example an thickness that is at least comparable to about half of the kerf gap and is preferably somewhat greater than the seam kerf gap size, can enable some imageable seam conditions that would otherwise not be imageable. As discussed further later, increased coating thickness tends to "hide" the effect of otherwise unacceptable adhesive electrical properties. This is because the perturbing effect on the electrostatic fields of seam gap electrical properties tends to get smaller with distance from the seam gap. The details of this will be discussed later. For now, note there can be an interest in using thick coatings for enabling certain optional imageable seam conditions.

There can be further preferred overcoat resistivity ranges if the dielectric thickness of the overcoat, $D_C$, is large, for example typically if $D_C$ is near or somewhat larger than around 25 microns. If the resistivity of the overcoat is above a critical value, the overcoat will begin to behave similar to an "insulator" during the dwell time near the transfer nips. Then, as is well known in the art of electrostatics, the voltage drop across the overcoat in the transfer nip will increase with increasing overcoat dielectric thickness. So, to achieve the same transfer field acting on the toner, the applied voltages on the transfer field generation device will have to increase as the overcoat dielectric thickness increases to compensate for the higher voltage drop across the overcoat. High voltages on transfer field generation devices are not desired because they can stress the system relative to causing unwanted higher fields in the pre-nip region of the transfer nip, they tend to add cost to the power supply, and in extremes too high a voltage can lead to undesired constraints on clearance distances needed to avoid arcing problems. So, if the overcoat dielectric thickness is too high when the resistivity of the overcoat is also too high, the applied voltages can be higher than desired. If the resistivity of the overcoat is less than a critical value, charge conduction through the overcoat thickness during the transfer nip dwell time reduces the voltage drop across the overcoat during the transfer nip dwell time. Thus the use of a sufficiently low overcoat resistivity can prevent the problem of undesirably large transfer voltages in spite of relatively large overcoat dielectric thickness.

The condition for a sufficiently low overcoat resistivity can be estimated by the condition that a characteristic "nip charge relaxation time" for charge flow through the overcoat thickness in the transfer nip, $T_\rho^{nipc}$ is at least comparable and is preferably smaller than a characteristic effective "nip dwell time" that a section of the intermediate belt spends in and very near the contact nip of the transfer field generation device, $T_{dnip}$. The nip dwell time $T_{dnip}$ can typically be estimated as the effective nip width W in the process travel direction of the field region near the bias field generation device in the transfer nip where the fields are building up, divided by the speed of the intermediate belt. For a bias roller field generation device, the effective nip width W is estimated as the size of the roller contact nip width plus the widths in the pre and post nip regions where the pre and post nip air gaps are around 50 microns. For a simple corona generation device, the effective nip width W is estimated as the width of the corona current density beam profile. For a corotron system the parameter $T_\rho^{nipc}$ is estimated from: $T_\rho^{nip}=K_C\rho_C\epsilon_0$. For a bias roller system the parameter $T_\rho^{nipc}$ is estimated from: $T_\rho^{nip}=K_C\rho_C\epsilon_0[1+D_C/\Sigma D_I]$, where $\Sigma D_I$ is the sum of the dielectric thickness of the toner, air, and other insulating layers, other than the overcoat within the transfer nip. For overcoats having a field dependent resistivity, the overcoat resistivity used in this estimate should typically be determined at a field corresponding to less than 100 volts, and more preferably around 10 volts, across the thickness of the overcoat. As an example, with a bias roller a typical effective nip width is around 0.1 inches and the parameter $\Sigma D_I$ is typically around 20 microns. For example, at a process speed of 10 in/sec and with a overcoat having a dielectric constant K=3, a desired resistivity to prevent high voltage drop across a 150 micron thick coating is around $\leq 1 \times 10^{10}$ ohm-cm. As another example, for a 25 micron thick overcoat and otherwise similar parameters to the previous example, a desired resistivity to prevent significant voltage drop across the overcoat during the transfer dwell time is around $\leq 3 \times 10^{10}$ ohm-cm. For this last example, if the process speed is 3 in/sec, a desired overcoat resistivity to prevent significant voltage drop across the overcoat during the transfer nip dwell time is around $\leq 10^{11}$ ohm-cm. With an overcoat having a "nip charge relaxation time" smaller than a characteristic effective "nip dwell time", there are minimal constraints on the thickness of the overcoat. From the examples, if a moderately high dielectric thickness overcoat is used most systems will typically prefer overcoat resistivity less than around $10^1$ ohm-cm and more preferably will typically prefer overcoat resistivity less than around $10^{10}$ ohm-cm if a very high dielectric thickness overcoat is used.

In the above discussions and in various other discussions of electrical properties in this patent, resistivities are referenced. However, typically a more fundamental characteristic is the "charge relaxation times." Charge relaxation times can be directly measured in a system using known techniques in the art of electrostatics, and charge relaxation times can be a more preferred way of specifying the suitable electrical properties for imageable seam intermediate transfer belts.

The above defined resistivity range where the "nip charge relaxation time" is smaller than the characteristic effective "nip dwell time" is also a desirable electrical property of a seam adhesive when significant adhesive overspill onto the substrate layer occurs. The expressions previously given for the nip relaxation time estimates are the same for the adhesive overspill if the resistivity $\rho_{OA}$, dielectric thickness $D_{OA}$ and dielectric constant $k_{OA}$ of the overspill are used instead of the resistivity and dielectric constant of the overcoat.

To understand the undesirable effects of a high resistivity adhesive overspill, refer back to FIG. 5, which shows adhesive overspill on the backside of a belt. The adhesive overspill adds an extra adhesive thickness in the seam region that is not present away from the seam. If the adhesive resistivity $\rho_{OA}$ is too high the adhesive acts like an "insulator" during the characteristic dwell time spent in the transfer field generation region within the transfer nip, and there will be a significant voltage drop across the adhesive in the transfer nip. As known in the art of electrostatics, the voltage drop across the high resistivity "insulating" adhesive will increase with increasing dielectric thickness $D_{OA}$ of the overspill. This reduces the voltage drop across the toner and hence reduces the transfer field in the overspill region. With too high a dielectric thickness $D_{OA}$ the transfer field perturbation in the overspill region due to the high resistivity "insulating" overspill exceed the 10% level that is typically preferred for an imageable seam intermediate transfer belt.

However, if the "nip charge relaxation time" of the overspill, $T_\rho{}^{nipOA}$ is smaller than the characteristic effective "nip dwell time" $T_{dnip}$ for the transfer system, the voltage drop across the overspill will be small. Thus the resistivity condition defined by the overspill condition where the "nip charge relaxation time" is smaller than the effective transfer "nip dwell time", $T_\rho{}^{nipOA} \ll T_{dnip}$, is most preferred in imageable seam intermediate transfer belt systems having significant adhesive overspill. This is significant because adhesive overspill is beneficial in that it increases the seam strength.

Although semiconductive overcoats in the resistivity ranges discussed above are useful and preferred for most imageable seam intermediate transfer systems, imageable seam systems can also have relatively higher resistivity overcoats and seam adhesive materials than that discussed above, with some constraints. In some intermediate transfer systems the use of higher resistivity overcoats has some advantages. For example, relatively high resistivity materials having good toner release properties and low cost are often more available than materials having some degree of electrical control. As another example, relatively high resistivity overcoats having high dielectric strength can substantially eliminate shorting issues, even when the intermediate belt substrate layer is relatively conducting. This is useful in systems that use substrate layer that has the proper resistivity at low applied fields but has an undesirably low resistivity at high applied field conditions (say 500 to 1000 volts drop across the belt). A sufficiently high resistivity overcoat can reduce the shorting issues in the transfer nip by increasing the composite resistance in the transfer nip.

If a "cyclic charge relaxation time", $T_\rho{}^{cyc}$, of the overcoat is much larger than a characteristic "cyclic dwell time", $T_{dcy}$, for the intermediate transfer system, then the overcoat will begin to behave like an "insulator" during the cycle dwell time. Then, charge will build up on the "insulating" overcoat after each transfer zone. This charge buildup can cause transfer problems in subsequent transfer zones if the voltage drop across the overcoat is too high. Also, charge deposition on the overcoat side after passing through transfer zones is generally due to air breakdown in the transfer zones and can be somewhat non-uniform. This can cause further transfer problems with very high resistivity overcoats, especially if the voltage drop across the overcoat is large. However, it is known in the art of electrostatics that the voltage drop across the overcoat is proportional to the dielectric thickness of the overcoat, $D_C$. Therefore, a low dielectric thickness overcoat can reduce the transfer problems related to very high resistivity overcoat. Furthermore, the uniformity and magnitude of the charge on an overcoat can be improved somewhat by using corona charge leveling devices known in the art, such as corotrons or scorotrons. Thus the combination of a "sufficiently small" coating dielectric thickness, typically $D_C < 25$ microns and more preferably less than around 10 microns, and the use of charge neutralizing devices can enable the use of relatively insulating coatings.

If more than one overcoating layer is applied to an imageable seam intermediate transfer belt, the properties of each layer needs to be considered. The sum of the contributions of the individual layers on the effective dielectric thickness of the composite overcoat should meet the preferred dielectric thickness levels. For example, if $T_\rho{}^{cyc} \gg T_{dcy}$ applies for all of the layers, then all of the layers behave "insulating" and the dielectric thickness values discussed above apply to the "sum of the dielectric thickness" of each of the individual layers. The sum of the individual dielectric thickness (thickness divided by dielectric constant) for the layers should typically be less than around 25 microns and more preferably should be less than around 10 microns for a high resistivity dielectric thickness overcoat in a multiple color intermediate transfer system. With multiple layer overcoats, it is also possible that some of the layers have high enough resistivity to behave "insulating" while some of the layers may have a low enough resistivity that no significant voltage drop across that layer's thickness occurs. If the condition $T_\rho{}^{cyc} \gg T_{dcy}$ applies for any of the layers, that layer behaves relatively insulating during the cyclic dwell time and that layer's dielectric thickness should be added to the total effective dielectric thickness. If the previously discussed condition $T_\rho{}^{nipC} \ll T_{dnip}$ applies for any other layer, that layer will have substantially no voltage drop across it after the cyclic dwell time and that layer's dielectric thickness should be taken as effectively zero for purposes of the previously discussed transfer nip issues caused by high dielectric thickness. Conditions between these extremes follow from these examples.

It is important to choose a seam adhesive that has electrical properties that are in "good correspondence" to the electrical properties of the substrate layer. Good correspondence does not mean "the same" electrical properties. Rather, good correspondence implies that the electrical properties produce sufficiently low field perturbations around seam to allow toner to be transferred onto and off of the seam region without significant degradation of the transferred image. As discussed previously, typically this means that the transfer field in the seam region should be within 20%, and more preferably it should be within 10%, of the transfer field in regions away from the seam.

To understand good correspondence it is useful to use the previously described characteristics of "nip charge relaxation times" and characteristic "nip dwell times." The desired resistivity relationships between the substrate and the adhesive depend on various system parameters that are best determined from these characteristic times. The nip charge relaxation time of the substrate far from the seam gap, $T_\rho{}^{nipS}$ is of interest because this will influence the transfer fields that are present "far" from the seam. Typically, "far" from the seam will usually mean distances from the seam along the belt surface that are much greater than the size of the seam region that has perturbed electrical properties relative to the far region. For example, in a puzzle cut imageable seam if the adhesive in the seam kerf gap has perturbed electrical properties relative to the substrate and the surrounding substrate puzzle cut "petals" have the same electrical properties as the substrate material far from the seam, "far" will mean distances much larger than the puzzle cut kerf gap. On the other hand, if the electrical properties of the surrounding substrate puzzle cut petals or nearby seam regions are perturbed relative to the far region, "far" will mean distances much larger than the size of such perturbed region. Such perturbations of the surrounding or nearby substrate regions of the seam can sometimes occur for example due to chemical, mechanical or other seam processing parameters such as local heating that might be used to achieve a good seam joining adhesion. At "far" distances from the perturbed electrical region of the seam, the transfer fields perturbations due to the perturbed electrical properties of the seam region are generally small. The parameter $T_\rho{}^{nipS}$ is the characteristic charge relaxation time it takes in the transfer nip for the voltage across the substrate layer thickness to drop due to conduction of charge across the substrate thickness. The approximate expressions for $T_\rho{}^{nipS}$ are the same as the ones described during the discussion of charge decay across the coating thickness. The substrate resistivity $\rho_s$, dielectric thickness $D_s$ and dielectric constant $K_s$ are now substituted for the corresponding coating properties previously discussed. Previous discussions of the influence of field dependent resistivities also apply here for both the substrate and the adhesive materials.

Figure 8:
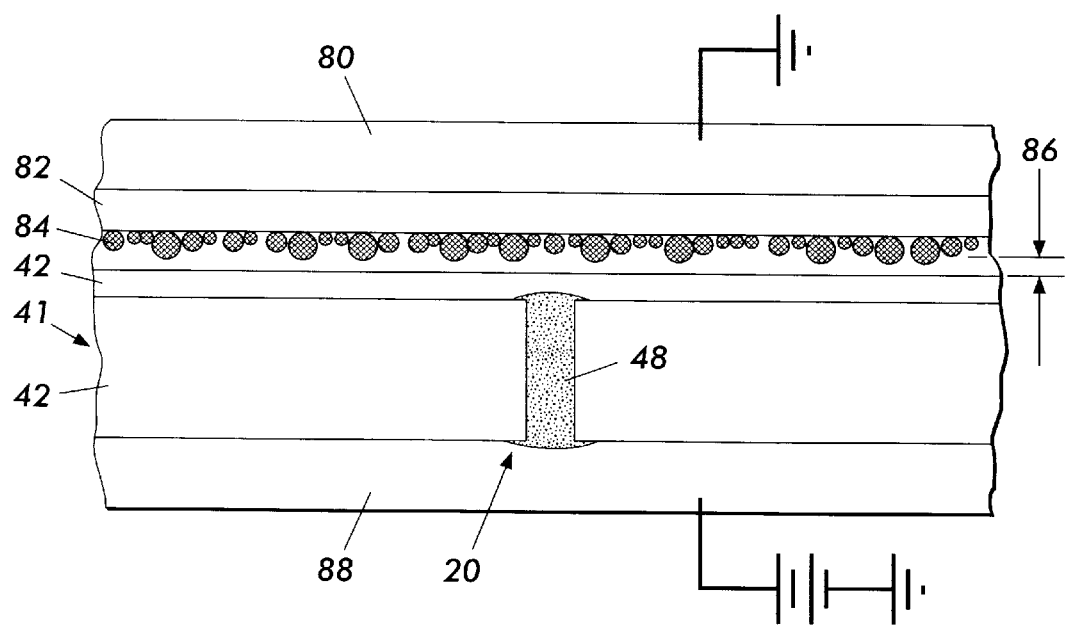
FIG. 8 is a schematic depiction of an imageable seam intermediate transfer belt in a transfer nip.

The transfer of toner onto an imageable seam intermediate transfer belt is explained with the assistance of FIG. 8, which illustrates a quasi-electrostatic situation within a transfer nip. As shown, a photoreceptor comprised of a ground conductor 80 and a photoconductive surface 82 holds a toner layer comprised of toner particles 84. Separated from the toner layer by an air gap 86 is an imageable seam intermediate transfer belt 41 (reference FIG. 6) that rides on a conductive roll 88. The transfer fields in the seam region are influenced by the characteristic seam relaxation time $T_\rho{}^{gap}$. This is the characteristic time it takes for charge to flow across the adhesive 48 in the seam gap 20. The description of the seam gap charge relaxation time $T_\rho{}^{gap}$ is somewhat more complex than for the substrate region far from the seam because the dimensions of the seam gap are typically comparable to the thickness of the substrate. Simple parallel plate approximations can often be used for the approximate relaxation times of the intermediate materials layers far from the seam, but this simple approximation does not apply around the scam gap. The characteristic nip charge relaxation across the seam gap is still proportional to the adhesive resistivity. However, the nip charge relaxation time for the adhesive in the small seam gap region is influenced somewhat by the surrounding substrate properties and by the geometry of the seam. It generally needs to be determined using numerical calculations or measurements.

If the substrate nip charge relaxation time far from the seam is much smaller than the nip dwell time, that is if $T_\rho{}^{nipS} \ll T_\rho{}^{dnip}$, there will be substantially no voltage drop across the substrate 10 during the dwell time in the transfer nip in belt regions far from the seam ($\Delta V_S = 0$). This is due to conduction across the substrate during the nip dwell time. On the other hand, if the charge relaxation time for the adhesive in the scam gap region is much larger than the nip dwell time, that is if $T_\rho{}^{gap} \gg T_{dnip}$, then the adhesive 48 begins to behave like an "insulator" during the transfer nip dwell time. Then, there can be a significant voltage drop $\Delta V_{gap}$ across the adhesive in the seam gap during the dwell time. Thus the voltage drop across the intermediate transfer belt will be somewhat higher in the scam region than in regions away from the seam region. Therefore, it follows that the transfer field will be lower in the seam gap region than in the regions away from the scam. As explained later, whether or not the electrical properties are in "good correspondence" for this case can depend on factors such as the dielectric constant of the adhesive material, $K_A$, the kerf gap width, and the overcoating thickness.

If the substrate nip charge relaxation time far from the seam is much larger than the nip dwell time, that is if $T_\rho{}^{nipS} \gg T_{dnip}$, there will then be a voltage drop $\Delta V_S$ across the substrate during the dwell time in the transfer nip in regions far from the seam. The voltage drop across the substrate is proportional to the dielectric thickness $D_S$ of the substrate. However, if the charge relaxation time for the adhesive 48 is much smaller than the nip dwell time, that is if $T_\rho{}^{gap} \ll T_{dnip}$, then due to conduction there will be substantially no voltage drop across the adhesive during the dwell time ($\Delta V_{gap} = 0$). In this case, it follows that the transfer field will be somewhat higher in the scam gap region than in regions far from the nip. The adhesive electrical properties are thus typically not in "good correspondence" with the substrate electrical properties. Whether or not the electrical properties are in "good correspondence" can depend on the dielectric constant of the substrate material, the kerf gap, and the overcoat thickness.

If the substrate nip charge relaxation time far from the seam is much smaller than the nip dwell time, that is if $T_\rho{}^{nipS} \ll T_{dnip}$, there will again be substantially no voltage drop across the substrate ($\Delta V_S = 0$) during the dwell time in belt regions far from the seam. Now, if the charge relaxation time for the adhesive in the seam gap region is also much smaller than the nip dwell time, that is if $T_\rho{}^{gap} \ll T_{dnip}$, then there will also be substantially no voltage drop ($\Delta V_{gap} = 0$) across the adhesive during the dwell time in the transfer nip. In this case, the voltage drop across the scam gap region and the voltage drop across the regions of the substrate far from the seam are about the same (nearly zero) in the transfer nip. So, the transfer fields $E_{far}$ and $E_{gap}$ in these two regions are substantially the same. In this case, the adhesive and substrate electrical properties are within the preferred conditions of "good correspondence." Note that in this instance the electrical properties of the adhesive and the substrate can be very different and still be in the most favorable regime of "good correspondence." Mainly to be in "good correspondence" in the resistivities of the seam adhesive and the substrate can be significantly different as long as both are always below a threshold level. Of course, as previously discussed, an intermediate transfer system can also have further constraints on the lower limit of the resistivity of the substrate and adhesive materials, due typically to "shorting" and lateral conduction problems. So, to be in "good correspondence" in systems subject to "shorting" and lateral conduction problems, the resistivities of the seam adhesive and the substrate should be below the values defined by the charge relaxation times, and they should also typically be above around the shorting and lateral conduction threshold values for the system.

To estimate the charge relaxation time for the seam gap region refer again to FIG. 8. The bottom of an intermediate transfer belt in the seam region of a transfer nip is assumed to be suddenly switched from ground potential to a fixed bias potential at time=0. The substrate and adhesive materials can then be treated as "leaky dielectrics" having a resistance and capacitance in parallel. This is a good approximation for the electrical behavior of typical intermediate transfer materials in transfer nips. The voltage drop across the center of the seam can be numerically calculated as a function of time after the voltage is applied to allow an estimate of the nip charge relaxation $T_\rho{}^{gap}$. For seam gaps large in comparison to the substrate thickness the charge relaxation time for the adhesive can be approximated by the simple parallel plate formula: $T_{\rho A} = K_A \rho_A \epsilon_0 [1 + D_A/\Sigma D_i]$. Indeed, the simple parallel plate approximation can often be used even for small gaps.

At any rate, the charge relaxation time $T_\rho{}^{gap}$ can be estimated numerically. As examples, an effective transfer nip width of 0.20 inches and a belt speed of 10 in/sec yields a nip charge relaxation time of $T_{dnip} = 0.020$ seconds. Then, adhesive resistivities of around $\leq 2 \times 10^{10}$ ohm-cm will achieve the condition $T_\rho{}^{gap} \ll T_{dnip}$. Another example, if the belt speed is decreased to 2.0 in/sec the dwell time is $T_{dnip} = 0.100$ seconds. The condition $T_\rho{}^{gap} \ll T_{dnip}$ would then occur at adhesive resistivities of around $\leq 1 \times 10^{11}$ ohm-cm. For many systems, the condition $T_\rho{}^{gap} \ll T_{dnip}$ will typically occur for adhesive resistivities near or below the around the $10^{10}$ ohm-cm resistivity range. However, this should be estimated for each specific system. Thus this "good correspondence" condition is mainly a condition of a relatively semiconductive substrate with a relatively semiconductive adhesive.

As discussed, the conditions $T_{\rho^{nipS}} \ll T_{dnip}$ and $T_{\rho^{gap}} \ll T_{dnip}$ are a preferred regime for good correspondence where the transfer fields are substantially the same in the seam and in regions far from the seam. However, in order for the electrical properties of the substrate and adhesive to be in good correspondence under all situations these conditions need to occur over the full range of variability of the substrate and adhesive electrical properties. For example, the conditions need to apply despite changes in the environment, manufacturing tolerance, and material aging conditions that may occur in the intermediate transfer system. Fortunately, the conditions $T_{\rho^{nipS}} \ll T_{dnip}$ and $T_{\rho^{gap}} \ll T_{dnip}$ for good correspondence can allow significant tolerance of an imageable seam intermediate transfer belt despite differences in the electrical properties of the two materials. For example, in an imageable seam intermediate system where "shorting" issues require $\geq 10^7$ ohm-cm for the intermediate transfer belt materials, the substrate and adhesive resistivities can be substantially anywhere within the tolerance range of $10^7$ to $10^{10}$ ohm-cm. To avoid lateral conduction issues, the lateral resistivity should typically be above $10^8$ ohms/square, preferably above $10^{10}$ ohms/square. In summary, the "good correspondence" imageable scam substrate and adhesive electrical property conditions defined by $T_{\rho^{nipS}} \ll T_{dnip}$ and $T_{\rho^{gap}} \ll T_{dnip}$ are most favorable due to high tolerance for differences in the substrate and adhesive resistivity.

In general, the substrate resistivity condition defined by $T_{\rho^{nipS}} \ll T_{dnip}$ is a most favorable one for imageable seam intermediate transfer belts. This substrate condition can even allow wider tolerance to the adhesive resistivity if the dielectric constant of the adhesive material is above a critical value. For example, this substrate resistivity condition can allow the adhesive material to be substantially "insulating" during the dwell time of the transfer nip while still achieving the desired "good correspondence" condition. To understand this, note that a relatively insulating adhesive causes some voltage drop across the adhesive, but the preferred substrate condition has substantially no voltage drop during the transfer nip dwell time. This is a fundamental cause of the perturbation of the transfer field in the seam region. However, as is well known in the art of electrostatics, the voltage drop across the "insulating" adhesive in the seam gap also decreases with increasing adhesive dielectric constant. Therefore, it follows that if the dielectric constant of the adhesive is sufficiently large, the resulting voltage drop across the adhesive in the gap can be made sufficiently small to achieve the desired less than 10% field perturbation in spite of the high adhesive resistivity. For example, consider a relatively insulating adhesive ($10^{12}$ ohm-cm; $T_{\rho^{gap}} \gg T_{dnip}$). If a substrate defined by the condition $T_{\rho^{nipS}} \ll T_{dnip}$ is used, then if the insulating adhesives has a dielectric constant $K_A > 12$ the desired <10% field perturbation is achieved when the kerf is around 25 microns. It follows from prior discussions that with lower kerf than 25 microns the desired <10% field perturbation can be achieved using somewhat lower $K_A$ than 12. Further, for systems can tolerate field perturbations somewhat higher than 10%, good correspondence can be obtained with lower $K_A$. Still, imageable scam intermediate belt systems wishing to operate under the conditions of a relatively insulating adhesive discussed above will typically prefer the seam region to have a $K_A$ greater than about 5.

Another constraint on the upper limit of the adhesive resistivity is cyclic charge buildup. Cyclic charge buildup occurs if the adhesive resistivity $\rho_A$ is so high that it interferes with subsequent transfers. To prevent this the adhesive cyclic charge relaxation time should be less than the cyclic dwell time between transfers ($T_{\rho^{cyA}} \ll T_{dcy}$). However, this still adds significant extra tolerance for the seam adhesive resistivity. For example, from extensions of previous estimates the desired adhesive resistivity for an imageable seam should typically be below around $10^{13}$ ohm-cm for most system conditions and should preferably be below around $10^{12}$ ohm-cm for high process speed systems having small distances between imaging stations.

In summary, the "good correspondence" condition to achieve typically acceptably low field perturbations for the semiconductive imageable seam substrate defined by $T_{\rho^{nipS}} \ll T_{dnip}$ can allow wide tolerance for adhesive resistivity if the adhesive resistivity is sufficiently low ($T_{\rho^{gap}} \ll T_{dnip}$) and even wider tolerance for adhesive resistivity (up to an seam gap $T_{\rho^{cy}} \ll T_{dcy}$) if the adhesive dielectric constant is moderately high, typically $K_a > 5$.

A similar dielectric constant effect can occur for the unfavorable electrical property correspondence: $T_{\rho^{nipS}} \gg T_{dnip}$ and $T_{\rho^{gap}} \ll T_{dnip}$. Here the substrate resistivity is high enough for it to be substantially an "insulator" during the transfer dwell time but the adhesive has a low enough resistivity so that there is substantially no voltage drop across the seam gap. Similar to the above discussion, the voltage drop across the substrate will get smaller as the substrate dielectric constant gets larger. Estimates of the field perturbation for this case as a function of the substrate dielectric constant $K_s$ suggest that, in order to achieve the desired <10% field perturbation, very high $K_s$ is desired. The desired $K_s$ for low field perturbation, and hence for acceptably good electrical property correspondence, can typically be greater than around 25 under some extreme conditions of a very thin overcoating layer such as a 5 micron thick layer, and with a condition of very large mismatch of the substrate and seam resistivities. The desired $K_s$ to achieve good electrical property correspondence for this case decreases with for example increasing overcoating thickness, but the desired $K_s$ is typically greater than around 5 for most systems.

Another "high resistivity" substrate case is the condition where: $T_{\rho^{gap}} \gg T_{dnip}$ and $T_{\rho^{nipS}} \gg T_{dnip}$. Under this condition the charge relaxation times for the substrate and adhesive are both much greater than the nip dwell time over the full range of materials variability. However, this is not a sufficient condition for insuring good correspondence. In this case the substrate and the adhesive act substantially like "insulators" during the dwell time of the transfer nips. When materials act like insulators during the transfer nip dwell time the voltage drop across the belt is proportional to the dielectric thickness of the belt materials. Due to this, good correspondence includes the constraint that the dielectric constants of the adhesive $K_a$ and the substrate $K_s$ are similar, typically within about 30%, and most preferably the dielectric constants are substantially the same. Also, even further constraints are needed for good correspondence. In particular, the resistivity of both the substrate and adhesive need to be chosen so as to avoid different amounts of cyclic charge buildup on the substrate and the adhesive between transfer stations. Otherwise, the different cyclic charge buildup in the seam region compared to regions away from the seam can cause field perturbations for subsequent toner transfers. There are two basic ways of addressing this problem.

The preferred way is for the substrate and adhesive to both have sufficiently low resistivity that discharge occurs between transfer stations. From analogy with previous discussions, the condition desired is $T_{\rho^{cy}} \ll T_{dcy}$ for both the substrate and the adhesive, where the cyclic charge relaxation time for both the substrate and the adhesive is much smaller than the cyclic dwell time between subsequent transfer stations. An alternative condition is where both the substrate and the adhesive resistivities are high enough so that the same cyclic charge buildup will occur on both the substrate and seam adhesive. While cyclic charge buildup is generally not desired, it can be acceptable with proper constraints. Having similar cyclic charge buildup between transfer stations on both the substrate and the adhesive will at least prevent field perturbations in subsequent transfer stations. From analogy to previous discussions, a necessary condition for similar 32 cyclic charge buildup is $T_\rho{}^{cy} \gg T_{dcy}$ for both the substrate and the adhesive. Also, the substrate and adhesive dielectric constants should be similar, and high dielectric constant substrate and adhesive are usually needed to avoid transfer problems associated with high resistivity, high dielectric thickness intermediate materials.

It can be inferred from all of the above discussions that high resistivity substrate materials ($T_\rho{}^{nipS} \gg T_{dnip}$) can allow imageable seam conditions. However, for the reasons discussed, substrates having electrical properties in the range $T_\rho{}^{nipS} \ll T_{dnip}$ are most preferred for imageable seam intermediate transfer belt systems.

Other conditions for the intermediate substrate electrical properties can make it more difficult to achieve desired "good correspondence" between the substrate and adhesive electrical properties for producing the desired low field perturbations with an imageable seam. For example, a difficult substrate condition for an imageable seam can occur when the resistivity of the substrate varies between conditions where the substrate charge relaxation time is sometimes shorter than and sometimes longer than the characteristic dwell times. Consider a case where the substrate resistivity under one set of extreme conditions may be low enough to have $T_\rho{}^{nipS} \ll T_{dnip}$ so that there is substantially no voltage drop across the substrate in the transfer nip dwell time for that extreme condition. Such an extreme condition might occur, for example, with substrates at the low resistivity end of the manufacturing tolerance and when the RH is high. If the substrate resistivity at an opposite set of extreme conditions is high enough so that the condition $T_\rho{}^{nipS} \gg T_{dnip}$ occurs, there will be a voltage drop across the substrate at this other extreme condition.

Ideally, the nominal adhesive electrical properties are relatively close to the substrate electrical properties within manufacturing tolerances and have similar response to environment, aging, and applied field factors. Otherwise, the adhesive and substrate materials can easily move away from the desired "good correspondence" conditions. One way of increasing the tolerance of an imageable seam intermediate belt system to differences in the electrical properties of the substrate and adhesive is to utilize a "sufficiently thick" overcoat. The use of a sufficiently thick overcoat can allow some of the less favorable conditions discussed above, such as the condition $T_\rho{}^{nipS} \gg T_{dnip}$ for the substrate while the adhesive material is at the condition $T_\rho{}^{nipA} \ll T_{dnip}$.

Overcoats can significantly reduce the perturbations of the transfer fields caused by poor matching of the electrical properties of the seam gap adhesive compared to the electrical properties of the substrate. It is the fields in the toner layer that drive toner transfer. An advantage of an overcoat is that it moves the seam gap further away from the toner layer. It is well known in the art of electrostatics that the effect on electrostatic fields of a local perturbing factor typically reduces with distance away from the perturbing factor. So, moving the field perturbing seam gap further away from the toner layer can greatly reduce the perturbations in the transfer field acting on the toner that would otherwise occur if, for example, the seam adhesive electrical properties are too highly mismatched compared to the electrical properties of the substrate. Generally the good effect of the overcoat on minimizing transfer field perturbations will increase with increasing overcoating thickness. So, a sufficiently thick overcoat can enable imageable seam systems that may wish to use highly mismatched seam adhesive and substrate electrical properties. Smaller kerf gap can also be an advantage over large kerf gaps in that the perturbing effect of the seam gap will also generally decrease quicker with distance away from the gap with smaller kerf gaps compared to larger gaps.

To estimate the desired overcoating properties for allowing highly mismatched adhesive and substrate electrical properties, the effects of the properties of the overcoating on the transfer fields needs to be estimated. The effect of the overcoating can be estimated using the quasi-static electrostatic numerical simulations similar to that discussed previously for estimating nip charge relaxation times. For example, assume a substrate resistivity of $10^8$ ohm-cm and a nip relaxation time $T_\rho{}^{sub}$ of around $7 \times 10^{-5}$ sec. With an adhesive resistivity of $10^{12}$ ohm-cm the adhesive gap nip relaxation time $T_\rho{}^{gap}$ can be estimated to be around 0.7 seconds. With a nip dwell time of 0.01 seconds, the adhesive electrical properties are highly mismatched to the substrate electrical properties: $T_\rho{}^{nipSb} \ll T_{dnip}$; $T_\rho{}^{gap} \gg T_{dnip}$. In this case the substrate can be considered to be "sufficiently conducting" during the nip dwell time that the voltage drop across the substrate thickness is negligible during the nip dwell time. On the other hand, the adhesive layer in the seam gap acts relatively "insulating" during the nip dwell time so there is some voltage drop across the seam adhesive thickness during the nip dwell time. Therefore, the transfer fields in a small air gap are perturbed by the mismatched electrical properties with the transfer fields in the seam gap region being smaller than the fields far from the seam. The air gap transfer fields can be estimated from numerical electrostatic analysis. Of interest is the field perturbation percentage P: $P=100[\text{abs}(E_{far}-E_{gap})]/E_{far}$. The parameter P is the seam field perturbation, that is the absolute value of the percentage difference of the transfer field in regions far from the seam gap compared to the transfer field in the center of the seam gap. As discussed, for an imageable seam intermediate transfer belt P should typically be less than 20% for most systems and preferably P should be less than 10% for some systems.

As the thickness of the overcoat, dc increases, the field perturbations decrease. Assuming a 25 micron wide kerf acceptable field perturbations usually can be achieved with overcoatings about 12 microns thick. Generally, smaller kerfs can allow thinner overcoatings such as 5 microns. Typically, acceptably low field perturbations will occur when the coating thickness is comparable to or thicker than the seam kerf gap. The beneficial effect on the transfer field perturbations occurs over a relatively wide range of overcoating resistivity. Generally lower resistivity overcoats result in lower field perturbations. In general, an overcoating should have a low enough resistivity to avoid cyclic charge issues without additional cyclic neutralizing devices. That is, the overcoating should have the condition $T_\rho{}^{cyc} \ll T_{dcy}$. This overcoating resistivity also enables a relatively wide mismatch in the adhesive and substrate electrical properties.

An imageable seam intermediate transfer belt that uses a substrate material having electrical properties within the preferred semiconductive condition ($T_\rho{}^{nipS} \ll T_{dnip}$) can tolerate both relatively insulating and sufficiently conducting adhesive materials with the addition of a "sufficiently thick" overcoating as defined above. That is, the overcoat allows the seam gap adhesive to behave relatively "insulating" in the transfer nip ($T_{\rho}^{nipA} >> T_{dnip}$) without causing unacceptable transfer field perturbation. Again, a semiconductive substrate defined by the condition ($T_{\rho}^{nipS} << T_{dnip}$) is most preferred for imageable seam intermediate transfer belts.

One further comment should be made regarding insulating adhesives. If the charge relaxation time for the adhesive is longer than the dwell time between transfer stations, then charge can accumulate on the backside of the adhesive in the seam gap. If allowed to accumulate, the adhesive charge can interfere with subsequent transfers. Therefore, if the seam adhesive resistivity is such that $T_{\rho}^{cy} >> T_{dcy}$, a charge neutralizing approach for the seam adhesive will be needed for the back of the belt. This can be done using simple contact static elimination devices, such as by using grounded contact brushes. Even more preferred, the adhesive resistivity is ideally kept sufficiently low such that $T_{\rho}^{cy} << T_{dcy}$, and then such discharging devices are not needed. From previous estimates, the desired adhesive resistivity is typically less than $10^{13}$ ohm-cm for most systems and preferably it is less than $10^{12}$ ohm-cm for many systems.

Another mismatch condition is a relatively insulating substrate and a relatively conducting adhesive, for example, a substrate having a high resistivity such that the nip relaxation time $T_{\rho}^{nipS}$ is around 0.7 seconds, and an adhesive having a low resistivity such that the adhesive gap nip relaxation time $T_{\rho}^{gap}$ is around $7 \times 10^{-5}$ seconds. Assuming a nip dwell time of 0.01 seconds, this represents a highly mismatched substrate and adhesive electrical property condition: $T_{\rho}^{nipS} >> T_{dnip}$; $T_{\rho}^{gap} << T_{dnip}$. The substrate now behaves substantially like an "insulator" during the dwell time of the transfer nip so that there is a voltage drop across the substrate during the transfer nip dwell time. However, the adhesive in the seam gap now acts like a "conductor" during the transfer nip dwell time, in that there is essentially no voltage drop across the seam gap adhesive layer during the transfer nip dwell time. In this case, the transfer fields are larger in the seam gap region compared to regions far from the seam. A much higher coating thickness is typically needed to "hide" the effects of the highly mismatched adhesive and substrate electrical properties than the case where the substrate is relatively conducting and the adhesive is relatively insulating. Mainly, this is because conduction through the relatively conductive adhesive drives the top of the adhesive layer to the applied potential, and this moves the source of the field perturbation closer to the toner layer.

At any rate, when the substrate resistivity is relatively high ($T_{\rho}^{nipS} >> T_{dnip}$) and the adhesive resistivity is relatively low ($T_{\rho}^{gap} << T_{dnip}$), a coating thickness above about 150 microns can be needed to achieve the preferred field perturbation of less than 10% for an imageable seam when the seam kerf gap is around 25 microns and the overcoating has a resistivity near 1012 ohm-cm. Again, factors such as a lower resistivity overcoating or lower kerf gap size can reduce the required overcoating thickness. However, typically the minimum overcoating thickness desired for reducing field perturbations in this case is typically larger than the size of the kerf and it is preferably at least three times as the kerf size.

The volume resistivity of a coating, can in general have different resistivity in the lateral direction and in the thickness direction of the coating. Independent of the volume resistivity in the thickness direction of the overcoating, a sufficiently low lateral resistivity for an overcoating can help to reduce the field perturbations that would otherwise be caused by mismatch of the electrical properties of the seam region and the far regions of the imageable seam intermediate belt. This is because lateral conduction in the seam region will tend to smooth out any tendency for voltage drops along the belt surface at the toner transfer interface with the imageable seam intermediate belt. A sufficiently low lateral resistivity overcoating can also be beneficial for reducing the tendency for toner disturbances that can occur when substrate materials having very high lateral resistivity are used with imageable seam intermediate transfer systems. For example, non uniform charge patterns can form on an intermediate transfer belt due to non uniform charge exchange between the near the transfer nips, and this can lead to a redistribution of the transferred toner in patterns that are typically referred to as "toner disturbance" defects. When the substrate lateral resistivity is somewhat below around $10^{12}$ ohms/square, these non uniform charge patterns can be dissipated via lateral conduction between subsequent transfer stations and this can reduce the toner disturbance problems. Even if the substrate lateral resistivity is somewhat above around $10^{12}$ ohms/square, in many systems toner disturbance problems can be reduced with imageable seamed intermediate transfer belts if the overcoating, used has a lateral resistivity below around $10^{12}$ ohms/square. The desired condition depends on details of the transfer system geometry and process speed conditions. Preferably for some systems the overcoating should be near or below around $10^{11}$ ohms/square for this, and more preferably it should be near or below around $10^{10}$ ohms/square when high process speed conditions are present. These same ranges of low overcoating lateral resistivity conditions are also desirable for reducing field perturbations caused by large electrical property mismatch conditions between the seam and far regions of the intermediate transfer belt via lateral conduction along the overcoating in the seam region.

If the lateral resistivity of the composite overcoated intermediate belt is below a threshold condition, significant charge conduction can occur laterally along the belt during the dwell time that a section of the intermediate belt takes to travel through the pre and post transfer nip regions of the transfer zone. The composite lateral resistivity can be taken to mean the lateral resistivity determined by treating the multiple layer belt as an equivalent composite single layer. The threshold lateral resistivity condition for the composite belt increases with factors such as with increasing process speed and with increasing distance between the transfer field generating device and the start of air gaps between the belt and the toner layers in the pre and post nip regions of the transfer system. At typical transfer geometry and process speeds significant lateral conduction effects can occur if the composite belt lateral resistivity is below about $10^{10}$ ohms/square. In the low lateral resistivity condition the electrostatic fields in the pre and post nip regions of the transfer zones can be affected by the lateral resistivity, and this can in turn cause a dependence of transfer on the lateral resistivity. Therefore, with an imageable seamed intermediate transfer belt, if the lateral conductivity of the composite belt in far regions away from the seam region of the belt is below around $10^{10}$ ohms/square, the electrical properties of the composite overcoated intermediate belt should be chosen to have substantially the same lateral resistivity in the seam region as in the far regions away from the seam. Some small difference can typically be allowed depending on factors such as the toner adhesion characteristics and on the acceptable amount of field perturbation that can be tolerated by the system before declaring an unacceptable level of difference between the transferred image in the seam and far regions.

However, typically the lateral resistivity of the composite imageable seamed intermediate belt in the seamed region should be within about a factor of four of the lateral resistivity of the composite imageable seamed intermediate belt in far regions beyond the seam region when the lateral resistivity of the composite belt is below about $10^{10}$ ohms/square in the far regions.

From all of the above discussions it follows that sufficiently thick overcoats having optimized resistivity enables a very wide mismatch in the electrical properties of the substrate and the adhesive. However, if a very thick overcoating is used the overcoating resistivity should be controlled to reduce transfer problems. Typically, if the overcoating dielectric thickness is above around 25 microns, the overcoating resistivity should preferably be low enough so that the nip charge relaxation time will be lower than the transfer nip dwell time to avoid high voltage drop across the overcoating during the transfer nip dwell time. It can be inferred from past discussions that the preferred overcoating resistivity will typically be below around $10^{10}$ ohm-cm for such high overcoating thickness cases. Finally, it should be noted that in practice an imageable seam intermediate transfer belt undergoes significant mechanical stresses. Therefore, the seam should have a seam strength of 15 pounds per linear inch or greater.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An imageable seamed intermediate transfer belt, comprising:
   a seamed substrate formed by joining ends of a belt at a seam, wherein said seamed substrate has a seam region around said seam and a far region away from said seam; and
   an overcoat on said seamed substrate having a toner bearing surface;
   wherein said seam region has good electrical property correspondence with said far region, and wherein said seam and far regions have lateral resistivity greater than $10^8$ ohms/square.

2. An imageable seamed intermediate transfer belt according to claim 1, wherein said far region has a bulk resistivity between $10^7$ and $10^{10}$ ohm-cm and said seam region has a bulk resistivity between $10^7$ and $10^{13}$ ohm-cm.

3. An imageable seamed intermediate transfer belt according to claim 1, wherein said far region has the bulk resistivity between $10^{10}$ and $10^{13}$ ohm-cm and the bulk resistivity of said seam region is between $5 \times 10^9$ and $10^{13}$ ohm-cm.

4. An imageable seam intermediate belt according to claim 1, wherein said far region and seam region have a bulk resistivity greater than $10^{13}$ ohm-cm, the dielectric thickness of the said far region is no greater than 25 microns, and the dielectric thickness of said far region and seam region are within 20% of each other.

5. An imageable seamed intermediate transfer belt according to claim 1, wherein said far region has the bulk resistivity between $10^{11}$ and $10^{13}$ ohm-cm and the bulk resistivity of said seam region is between $5 \times 10^{10}$ and $10^{13}$ ohm-cm.

6. An imageable seamed intermediate transfer belt according to claim 1, wherein said overcoat has a bulk resistivity less than $10^{13}$ ohm-cm.

7. An imageable seam intermediate belt according to claim 1, wherein said overcoat has a lateral resistivity less than $10^{12}$ ohms/square.

8. An imageable seam intermediate belt according to claim 1, wherein said substrate has a lateral resistivity above $10^{12}$ ohms/square and said overcoat has a lateral resistivity less than $10^{11}$ ohms/square.

9. An imageable seam intermediate belt according to claim 1, wherein said far region has a lateral resistivity less than $10^{10}$ ohms/square and said seam region has a lateral resistivity that is within a factor of four of the lateral resistivity of said far region.

10. An imageable seamed intermediate transfer belt according to claim 1, wherein said seam region has a bulk resistivity less than $10^{13}$ ohm-cm, wherein said far region has a bulk resistivity less than said bulk resisitivity of said seam region, and wherein said seam region has a dielectric constant K greater than 5.

11. An imageable seamed intermediate transfer belt according to claim 1, wherein said seam region has a bulk resistivity less a bulk resistivity of said far region, and wherein said far region has a dielectric constant K greater than 5.

12. An imageable seamed intermediate transfer belt according to claim 1, wherein said far region has a bulk resistivity less than $10^{13}$ ohm-cm.

13. An imageable seamed intermediate transfer belt according to claim 1, wherein said overcoat has a thickness greater than 5 microns.

14. An imageable seamed intermediate transfer belt according to claim 13, wherein said far region and said seam region both have a bulk resistivity less than $10^{13}$ ohm-cm.

15. An imageable seamed intermediate transfer belt according to claim 13, wherein said overcoat has a bulk resistivity less than $10^{13}$ ohm-cm.

16. An imageable seamed intermediate transfer belt according to claim 13, wherein said overcoat has a bulk resistivity between $10^8$ and $10^{12}$ ohm-cm.

17. An imageable seamed intermediate transfer belt according to claim 13, wherein said overcoat has a dielectric thickness greater than 25 microns and the bulk resistivity of said overcoating is not greater than $10^{10}$ ohm-cm.

18. An imageable seamed intermediate transfer belt according to claim 1, wherein said seam region has a bulk resistivity and a lateral resistivity within a factor of 5 of said bulk resistivity and lateral resistivity of said far region.

19. An imageable seamed intermediate transfer belt, comprising:
    a seamed substrate formed by joining ends of a belt having a top-side surface and a back-side surface along a kerf to form a seam, wherein said seamed substrate has a seam region around said kerf and a far region away from said kerf; and
    an overcoat on said top-side surface, said overcoat having a toner-bearing surface;
    wherein said seam region has good electrical property correspondence with said far region, and wherein said seam and far regions have lateral resistivity greater than $10^8$ ohms/square.

20. An imageable seamed intermediate transfer belt according to claim 19, wherein said overcoat has a thickness greater then twice the width of said kerf.

21. An imageable seamed intermediate transfer belt according to claim 19, wherein a bulk resistivity of said seam region is less then $10^{10}$ and bulk resistivity of said far region is greater than $10^{10}$, then said overcoat has a thickness greater then three times the width of said seam region.

22. An imageable seamed intermediate transfer belt according to claim 19, further including an adhesive within said kerf.

23. An imageable seamed intermediate transfer belt according to claim 22, wherein said adhesive extends over a surface of said substrate with a height of less than 5 microns.

24. An imageable seamed intermediate transfer belt according to claim 19, wherein said imageable seamed intermediate transfer belt has short wavelength topological disturbances no greater than 10 microns.

25. An imageable seamed intermediate transfer belt according to claim 19, wherein said imageable seamed intermediate transfer belt has long wavelength topological disturbances no greater than 25 microns.

26. An imageable seamed intermediate transfer belt according to claim 19, wherein said seam has a mechanical seam strength greater than 15 pounds per linear inch.

27. An imageable seamed intermediate transfer belt according to claim 19, further including a kerf fill material having a resistivity less then $10^{10}$ and that extends over said back-side surface, wherein said kerf fill material has short wavelength disturbances less than 10 microns and long wavelength disturbances less then 25 microns.

28. An imageable seamed intermediate transfer belt according to claim 19, further including a kerf fill material that extends over said top-side surface, wherein said kerf fill material has short wavelength disturbances less than 10 microns, and long wavelength disturbances less then 25 microns, and wherein said overcoating has a thickness greater than said kerf fill material extension.

29. An imageable seamed intermediate transfer belt according to claim 19, wherein said seam is formed by interlocking elements.

* * * * *